United States Patent [19]
Saito

[11] Patent Number: 5,247,386
[45] Date of Patent: Sep. 21, 1993

[54] LASER SCANNING SYSTEM

[75] Inventor: Taizo Saito, Okayama, Japan

[73] Assignee: Asahi Kogaku Kogyo Kabushiki Kaisha, Tokyo, Japan

[21] Appl. No.: 872,832

[22] Filed: Apr. 23, 1992

[30] Foreign Application Priority Data

Apr. 25, 1991 [JP] Japan .................................. 3-65208

[51] Int. Cl.⁵ .............................................. G02B 26/08
[52] U.S. Cl. ...................................... 359/216; 359/196
[58] Field of Search ............... 359/216, 217, 218, 219, 359/196; 250/235, 236; 346/108, 160

[56] References Cited

U.S. PATENT DOCUMENTS

| | | | |
|---|---|---|---|
| 4,823,002 | 4/1989 | Saito | 250/235 |
| 4,847,492 | 7/1989 | Houki | 250/235 |
| 4,918,306 | 4/1990 | Saito | 250/235 |
| 4,998,790 | 3/1991 | Iizuka et al. | 359/196 |
| 5,066,987 | 11/1991 | Minefuji et al. | 355/233 |

FOREIGN PATENT DOCUMENTS 52-113750 9/1977 Japan .
2-230211 12/1990 Japan .

Primary Examiner—Loha Ben
Attorney, Agent, or Firm—Sandler Greenblum & Bernstein

[57] ABSTRACT

In a laser scanning system for an electrophotographic imaging apparatus, a laser beam, emitted from a laser source, is deflected to repeatedly scan a predetermined angle zone. Before the scanning of the predetermined angle zone, the deflected laser beam is received by a light receiving member. A cover member, projected from a housing of the laser scanning system, covers the light receiving member in such a fashion that the incident of the deflected laser beam is prevented from entering at least an upstream side portion of the light receiving member. The cover member allows the light receiving device to receive the deflected laser beam at a position having a predetermined positional relationship with the laser source.

18 Claims, 3 Drawing Sheets

LASER SCANNING SYSTEM

BACKGROUND OF THE INVENTION

The present invention relates to a laser scanning system employed in an electrophotographic imaging apparatus such as a laser beam printer and the like.

Conventionally, the optical scanning systems, such as the laser scanning system, have been employed in a laser beam printer. In such laser scanning systems, for example, a laser beam emitted by a laser emitting device is deflected by a polygon mirror and directed to the surface of photoconductive member through the fθ lens. As the polygon mirror rotates, the laser beam is deflected by the light reflecting surface of the polygon mirror, and repeatedly scans a predetermined angle zone of the surface of the photoconductive member. The laser beam is ON/OFF modulated in accordance with an image to be processed. In order to synchronize the scanning operation, as described above, with the imaging operation, the deflected laser beam is received at a predetermined position before the deflected laser beam scans the predetermined angle zone. For this purpose, a light receiving member is provided at an upstream side with respect to the scanning direction of the laser beam. Further, in order to let the deflected beam be focused on the light receiving member, a converging lens is provided between the polygon mirror and the light receiving member. The light receiving member outputs a signal upon receiving the laser beam. Thus a horizontal synchronous signal is generated by the light receiving member. When a predetermined period elapses, after the horizontal synchronous signal is generated, the laser beam scans the predetermined angle zone of the photoconductive member as aforementioned.

If the position of the light receiving member is shifted, since the scanning operation is performed at a predetermined period after the horizontal synchronous signal has been generated, the laser beam can not exactly scan the predetermined angle zone of the photoconductive member. In other words, the light receiving member should be accurately installed in the laser scanning system.

Further, in the construction described above, in general, the focal length of the lens, disposed between the polygon mirror and the light receiving member, is made smaller than that of the fθ lens. Accordingly, only a small amount of difference in the position of the light receiving member affects the scanning operation.

SUMMARY OF THE INVENTION

It is therefore an object of the invention to provide an improved laser scanning system, in which the laser beam scans a predetermined angle zone, even if the light receiving member is not installed at its accurate position.

For the above object, according to the present invention, there is provided a laser scanning system for an electrophotographic image according apparatus having a photoconductive material to be exposed to laser beam. The laser scanning system includes:

a laser source for emitting a laser beam;

a deflecting device for deflecting the laser beam emitted by the laser source so that the laser beam repeatedly scans at least a predetermined angle zone; and a light receiving device for receiving the deflected laser beam before the predetermined angle zone is scanned by the deflected laser beam.

The laser scanning system further includes a light shield member arranged to have a predetermined positional relationship with the laser source covering at least an upstream side portion, along the scanning direction of the deflected laser beam, of the light receiving device. The light shield member prevents a portion of the deflected laser beam from entering the light receiving device. Thus, the light receiving device receives the deflected laser beam at a position having a predetermined positional relationship with the laser source.

According to another aspect of the invention, there is provided a laser scanning system for performing a scanning operation of a laser beam on a material exposed to the laser beam. The laser scanning system includes:

a laser source for emitting a laser beam;

a deflecting device for deflecting the laser beam emitted by the laser source so as to repeatedly scan at least a predetermined angle zone;

a light receiving device for receiving the deflected laser beam before each time the predetermined angle zone is scanned by the deflected laser beam; and covering device for covering at least an upstream portion of the light receiving device along the scanning direction of the deflected laser beam so that scanning of the predetermined angle zone is performed at a predetermined period after the light receiving device has received the deflected light.

DESCRIPTION OF THE ACCOMPANYING DRAWINGS

DESCRIPTION OF THE EMBODIMENT

Figure 1:
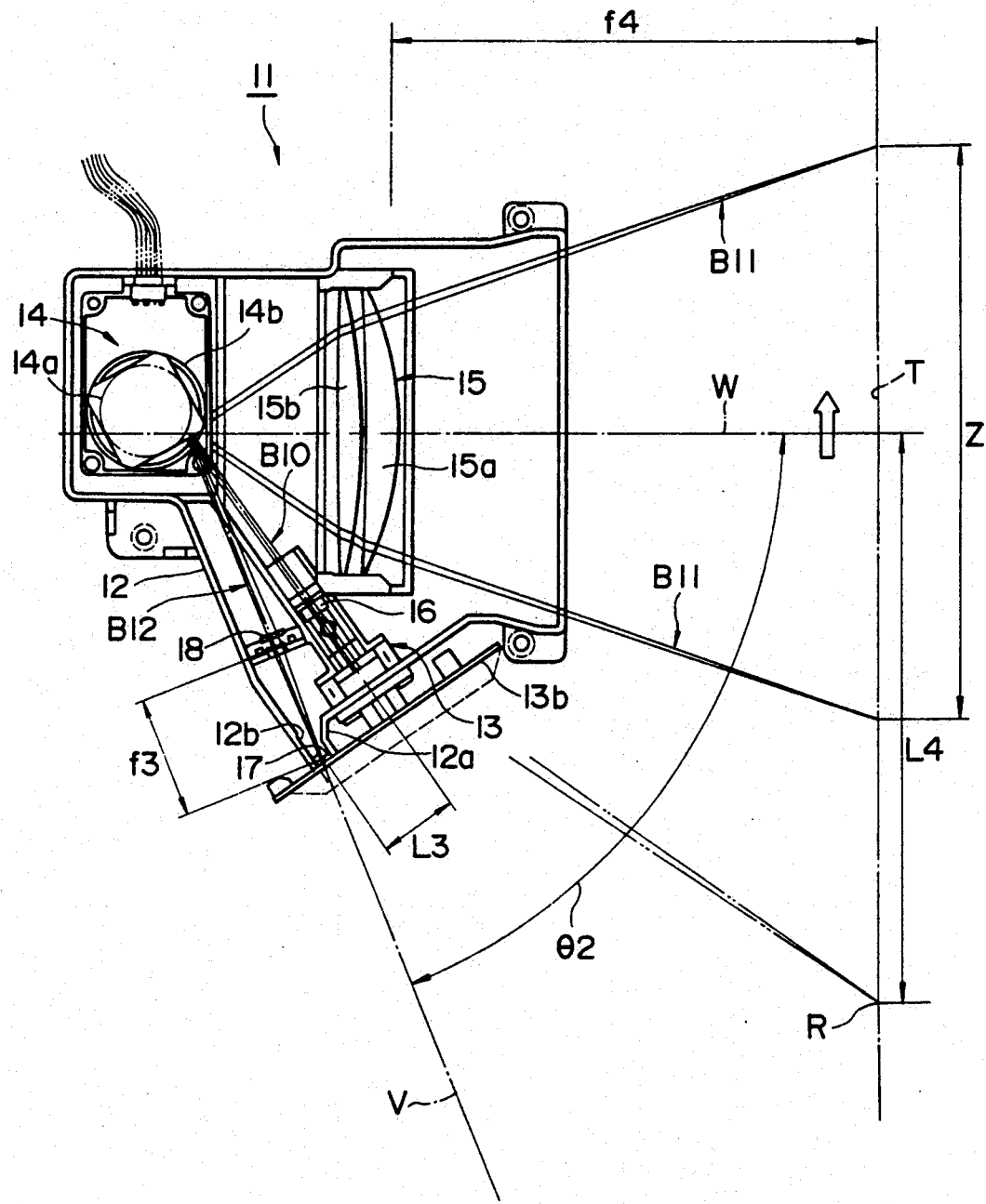
FIG. 1 is a top view of a laser scanning system embodying the present invention.

FIG. 1 is a top view of a laser scanning system embodying the present invention.

The laser scanning system 11 includes a housing 12, a laser source 13 for emitting laser beam B10, and a deflecting means 14 for deflecting the laser beam B10 to repeatedly scan a predetermined angle zone Z of a photoconductive member T, such as a photoconductive drum. The laser scanning system further includes an fθ lens 15 for focusing the laser beam on to the photoconductive member and regulating a scanning speed on the photoconductive member T, and a cylindrical lens 16 for compensating for optical characteristics such as aspherical aberration due to manufacturing error thereof. The laser source 13 is fixedly disposed in the housing 12. The cylindrical lens 16 is arranged between the laser source 13 and the deflecting means 14.

Figure 2:
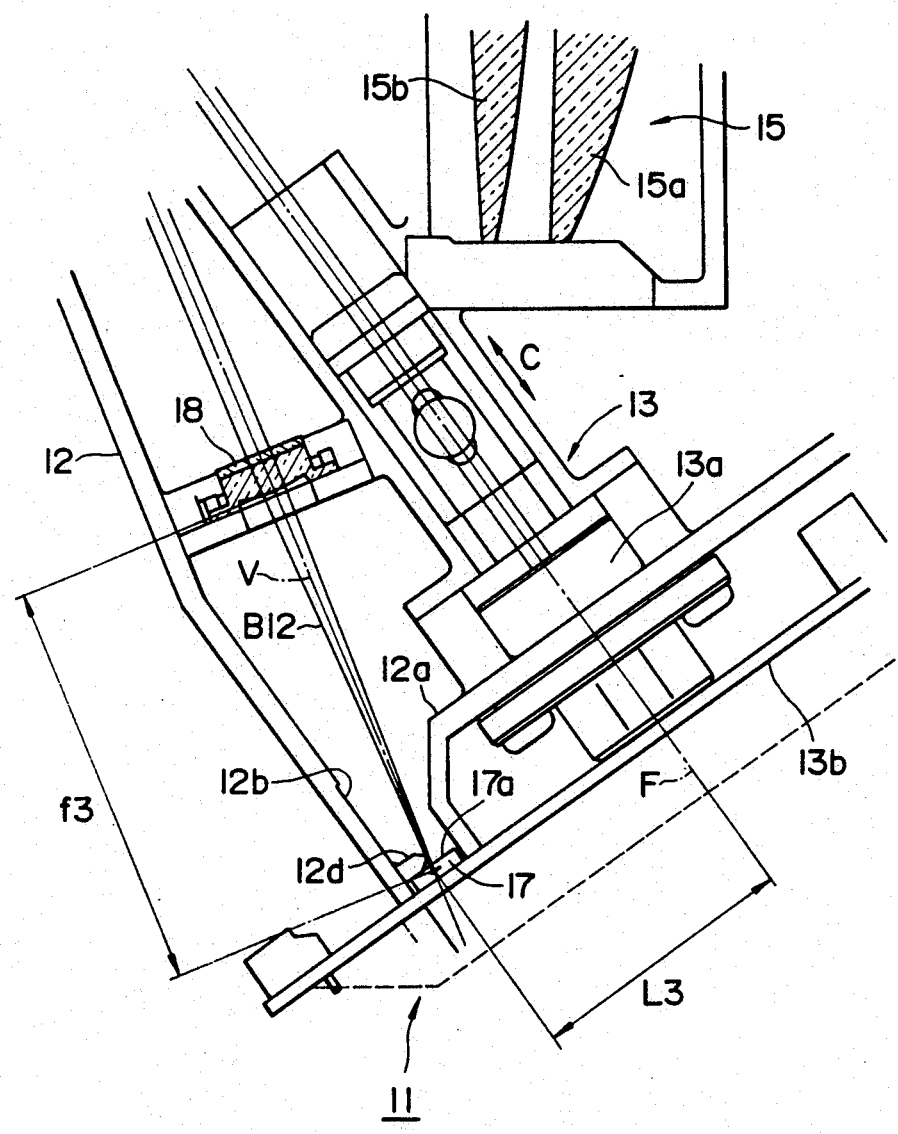
FIG. 2 is an enlarged partial top view of the laser scanning system.

As shown in FIG. 2, the laser source 13 includes a collimator unit 13a, and a base plate 13b. The collimator unit 13a is provided with a semiconductor laser to be turned ON/OFF in accordance with an electric signal. The collimator unit 13a is further provided with a collimator lens for allowing the light emitted by the semiconductor laser to pass through, and collecting the light emitted from the semiconductor laser into a parallel beam. The laser source 13 is fixedly secured to an installation wall 12a, which is uprightly formed in the housing 12.

The deflecting means 14 includes a polygon mirror 14a, and a motor 14b for rotating the polygon mirror in relatively high speed. The fθ lens 15 consists of a first fθ lens 15a and a second fθ lens 15b.

The cylindrical lens 16 is fixedly disposed on the housing 12 between the laser source 13 and the deflecting means 14. The aspherical aberration, due to the manufacturing error of the fθ lens 15, is compensated by shifting the position of the cylindrical lens 16 in the direction of arrow C in FIG. 2.

The laser scanning system 11 further comprises a light receiving member 17, a converging lens 18, and a horizontal synchronous signal generating circuit 20. The light receiving member 17 receives a laser beam B12, which is deflected toward the upstream side of the laser source 13 along the scanning direction.

The converging lens 18 is provided between the deflecting means 14 and the light receiving member 17. The converging lens 18 has a predetermined positive magnifying power in the direction orthogonal to a direction in which the laser beam B12 scans (i.e., a main scanning direction). Thus, the laser beam B12 is converged through the converging lens 18 in the direction orthogonal to the main scanning direction, so that the converged laser beam B12 can satisfy a required power density on the light receiving member 17.

The horizontal synchronous signal generating circuit 20 outputs a horizontal synchronous signal. A synchronous position R, on the photoconductive member T, along a direction of main scanning, i.e., a direction in which the laser beam B11 is deflected by the deflecting means 14, is identified when the synchronous signal is outputted by the horizontal synchronous signal circuit 20. It should be noted that if the light receiving member 17 is not provided and the beam B12 passes through the fθ lens 15, the beam B12 should be emitted to the position R.

The light receiving member 17, as shown in FIG. 2, is mounted on the base plate 13b which is fixedly secured on the housing 12, positioned between the installation wall 12a and a side wall 12b closely to the laser source 13. The light receiving surface 17a of the light receiving member 17 confronts the beam B12.

In front of the light receiving surface 17a, a light shield wall 12d is projected from the side wall 12b and partially covers the light receiving surface 17a, so that the beam B12, deflected by the deflecting means 14 and emitted toward the light receiving member 17, is partially shielded by the light shield wall 12d on the upstream side of the light receiving surface 17a in the scanning direction.

When the polygon mirror 14a starts rotating at a high speed as the motor 14b is driven, the laser beam B12, deflected by the deflecting means 14, is incident by way of the lens 18. When a sensor chip 17b receives the laser beam B12, the horizontal synchronous signal generating circuit 20 outputs the horizontal synchronous signal.

Figure 3:
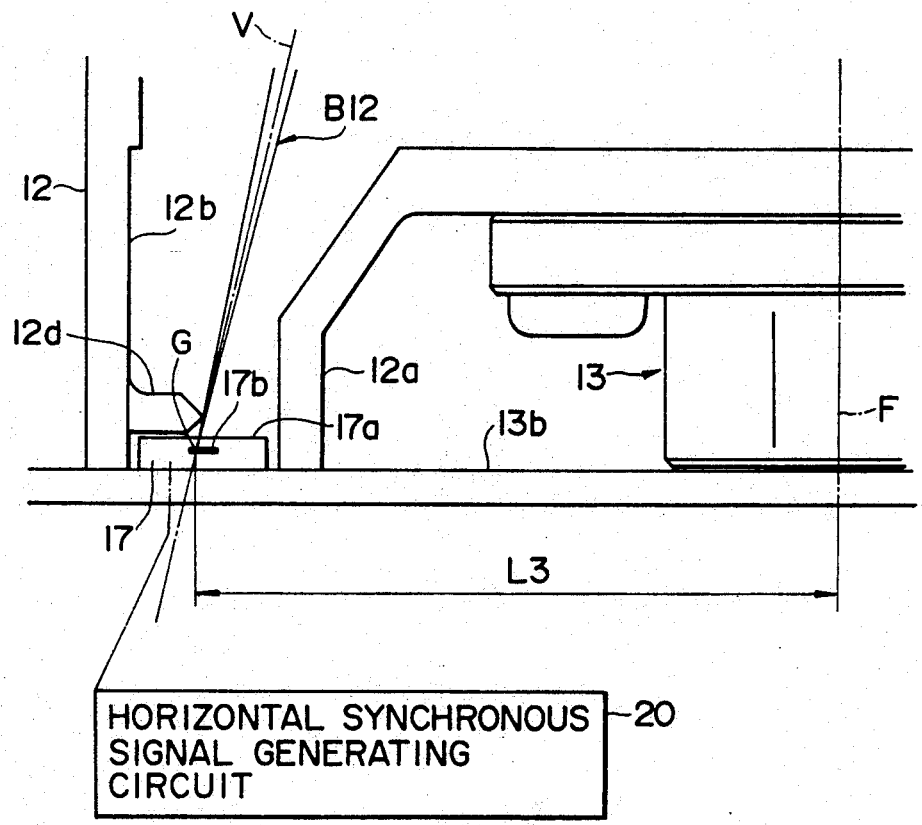
FIG. 3 is another enlarged view showing a light receiving member embodying the present invention.

The beam B12, emitted toward the light receiving surface 17a, is partially shielded by the shield wall 12d. Therefore, the sensor chip 17b receives the beam B12 when the scanning beam B12 reaches the point G in FIG. 3. It should be noted that the positional relationship between the point G and the synchronous position R never changes, even if the installation error of the light receiving member 17, with respect to the base plate 13b, exists. The position of the point G depends on the projecting amount of the light shielding wall 12d, with respect to the side wall 12b.

Since the laser source 13, and the side wall 12b are respectively fixed to the housing 12, the positional relationship between the optical axis F of the laser source 13 and the housing 12 is fixed. The distance L3, between the point G and the optical axis F, is kept constant regardless of the installed condition of the base plate 13b with respect to the housing 12, or the installed condition of the light receiving member 17 with respect to the base plate 13b.

If FIG. 1, distance L4 is obtained as follows:

$$L4 = f4 \times \theta 2$$

wherein $\theta 2$ is an angle formed between the optical axis V of the lens 18, which passes the point G of the sensor chip 17b, and the optical axis W of the fθ lens; and f4 is a focal length of the fθ lens.

Further, in the laser scanning system 11 of FIG. 1, the positional error ΔL4 of the position R, due to the installation error ΔL3 of the light receiving member 17, with respect to the laser source 13, is obtained as follows:

$$\Delta L4 = \Delta L3 (f4/f3)$$

wherein, f3 is a focal length of the lens 18; and f4 is the focal length of the fθ lens 15.

Generally, the focal length f3 of the lens 18 is considerably shorter than the focal length f4 of the fθ lens 15, because of the constructional requirement of the laser beam printer. Accordingly, the value (f4/f3) becomes greater than 1, therefore the distance L3 is changed by relatively small amount, whereas the distance L4 is greatly changed.

According to the present invention, however, the distance L3 is kept constant regardless of the installed condition of the base plate 13b to the housing 12, or the installed condition of the light receiving member 17 to the base plate 13b. When manufacturing, by forming the housing 12 and the light shielding wall 12d so that the distance L3 equals a predetermined value, the synchronous position R of the beam B11, in the main scanning direction, can be kept at a constant position.

Although, in the embodiment described above, the light shielding wall is projected from the side wall of the housing, it is of course possible to form the light shielding wall to be projected from the bottom surface of the housing.

As described above, according to the present invention, the light shielding wall is provided in the housing for partially shielding the light receiving member from the upstream side, with respect to the scanning direction of the laser beam. Even if there exists an installation error of the light receiving member with respect to the laser source, the distance between the light receiving position of the light receiving member and the laser source is made constant. Thereby, the timing of detecting the synchronous position prior to the main scanning operation is constant.

The present disclosure relates to subject matters contained in Japanese Utility Model Application No. HEI3-65208, filed on Apr. 25, 1991, which is expressly incorporated herein by reference in its entirety.

What is claimed is:

1. A laser scanning system for an electrophotographic image recording apparatus having a photoconductive material to be exposed to a laser beam, comprising:

laser source for emitting a laser beam;

deflecting means for deflecting the laser beam emitted by said laser source, so that the laser beam repeatedly scans at least a predetermined angle zone;

light receiving means for receiving the deflected laser beam before said predetermined angle zone is scanned by the deflected laser beam; and a light shield-member arranged to have a predetermined positional relationship with said laser source for covering at least an upstream side portion, along a scanning direction of the deflected laser beam, of said light receiving means, said light shield member preventing a portion of the deflected laser beam from entering said light receiving means, whereby said light receiving means receives the deflected laser beam at a position having a predetermined positional relationship with said laser source.

2. The laser scanning system according to claim 1, wherein said deflecting means comprises a polygon mirror to be driven to rotate.

3. The laser scanning system according to claim 1, wherein said laser source comprises a semiconductor laser.

4. The laser scanning system according to claim 3, further comprising a converging lens arranged between said deflecting means and said light receiving means for causing the deflected laser beam to focus on a light receiving portion of said light receiving means.

5. The laser scanning system according to claim 4, wherein said converging lens has a predetermined magnifying power in a direction orthogonal to the scanning direction of the laser beam.

6. The laser scanning system according to claim 1, further comprising a housing member for mounting said laser source thereon, said light receiving means being attached to said housing member, said light shield member being integrally provided on said housing member.

7. The laser scanning system according to claim 6, wherein said light shield member comprises a plate member projected in front of a part of said light receiving means, from said housing member.

8. The laser scanning system according to claim 7, wherein said housing member comprises a bottom surface on which said laser source and said deflecting means are provided, said bottom surface being substantially parallel with a plane formed by the deflected laser beam and a wall member substantially orthogonal to said bottom surface; and wherein said plate member is projected from said bottom surface.

9. The laser scanning system according to claim 7, wherein said housing member comprises a bottom surface on which said laser source and said deflecting means are provided, said bottom surface being substantially parallel with a plane formed by said deflected laser beam, and a wall member substantially orthogonal to said bottom surface; and wherein said plate member is projected from said wall member.

10. A laser scanning system for performing a scanning operation by a laser beam on a material to be exposed to the laser beam, comprising:

a laser source for emitting a laser beam;

deflecting means for deflecting the laser beam emitted by said laser source, so as to repeatedly scan at least a predetermined angle zone;

light receiving means for receiving the deflected laser beam before each time said predetermined angle zone is scanned by the deflected laser beam; and covering means for covering at least an upstream portion of said light receiving means along a scanning direction of the deflected laser beam so that scanning of said predetermined angle zone is performed at a predetermined period after said light receiving means has received the deflected laser beam.

11. The laser scanning system according to claim 10, wherein said deflecting means comprises a polygon mirror to be driven to rotate.

12. The laser scanning system according to claim 10, wherein said laser source comprises a semiconductor laser.

13. The laser scanning system according to claim 12, further comprising a converging lens arranged between said deflecting means and said light receiving means for causing the deflected laser beam to focus on a light receiving portion of said light receiving means.

14. The laser scanning system according to claim 13, wherein said converging lens has a predetermined magnifying power in a direction orthogonal to the scanning direction of the laser beam.

15. The laser scanning system according to claim 10, further comprising a housing member for mounting said laser source thereon, said light receiving means being attached to said housing member, said covering means being integrally provided on said housing member.

16. The laser scanning system according to claim 15, wherein said covering means comprises a plate member projected from said housing member in front of said upstream portion of said light receiving means.

17. The laser scanning system according to claim 16, wherein said housing member comprises a bottom surface on which said laser source and said deflecting means are provided, said bottom surface being substantially parallel with a plane formed by the deflected laser beam and a wall member substantially orthogonal to said bottom surface; and wherein said plate member is projected from said bottom surface.

18. The laser scanning system according to claim 16, wherein said housing member comprises a bottom surface on which said laser source and said deflecting means are provided, said bottom surface being substantially parallel with a plane formed by said deflected laser beam and a wall member substantially orthogonal to said bottom surface; and wherein said plate member is projected from said wall member.

* * * * *